United States Patent
Dennis

(10) Patent No.: US 8,733,128 B2
(45) Date of Patent: May 27, 2014

(54) MATERIALS AND/OR METHOD OF MAKING VACUUM INSULATING GLASS UNITS INCLUDING THE SAME

(75) Inventor: Timothy A. Dennis, Bloomdale, OH (US)

(73) Assignee: Guardian Industries Corp., Auburn Hills, MI (US)

( * ) Notice: Subject to any disclaimer, the term of this patent is extended or adjusted under 35 U.S.C. 154(b) by 29 days.

(21) Appl. No.: 12/929,874

(22) Filed: Feb. 22, 2011

(65) Prior Publication Data
US 2012/0211146 A1   Aug. 23, 2012

(51) Int. Cl.
*C03B 23/24* (2006.01)
*C03C 8/04* (2006.01)
*C03C 27/06* (2006.01)

(52) U.S. Cl.
CPC . *C03C 27/06* (2013.01); *C03C 8/04* (2013.01); *C03B 23/24* (2013.01)
USPC .................... 65/42; 156/99; 156/109

(58) Field of Classification Search
USPC ........................................ 65/33.6
See application file for complete search history.

(56) References Cited

U.S. PATENT DOCUMENTS

| | | |
|---|---|---|
| 3,650,778 A | 3/1972 | Dumesnil et al. |
| 3,837,866 A | 9/1974 | Malmendier et al. |
| 4,256,495 A | 3/1981 | Kawamura et al. |
| 4,683,154 A | 7/1987 | Benson et al. |
| 4,743,302 A | 5/1988 | Dumesnil et al. |
| 4,801,488 A | 1/1989 | Smith |
| 4,820,365 A | 4/1989 | Brumm et al. |
| 5,013,360 A | 5/1991 | Finkelstein et al. |
| 5,051,381 A | 9/1991 | Ohji et al. |
| 5,188,990 A | 2/1993 | Dumesnil et al. |
| 5,336,644 A | 8/1994 | Akhtar et al. |
| 5,534,469 A | 7/1996 | Hayashi |
| 5,657,607 A | 8/1997 | Collins et al. |
| 5,664,395 A | 9/1997 | Collins et al. |
| 5,902,652 A | 5/1999 | Collins et al. |
| 6,365,242 B1 | 4/2002 | Veerasamy |

(Continued)

FOREIGN PATENT DOCUMENTS

| | | |
|---|---|---|
| AU | 60 657 | 1/1967 |
| DE | 195 45 422 | 6/1997 |

(Continued)

OTHER PUBLICATIONS

"Laser Sintering of Thick-Film Conductors for Microelectronic Applications", Kinzel et al.

(Continued)

*Primary Examiner* — Matthew Daniels
*Assistant Examiner* — Cynthia Szewczyk
(74) *Attorney, Agent, or Firm* — Nixon & Vanderhye P.C.

(57) ABSTRACT

Certain example embodiments relate to frit materials that have an improved IR absorption property. Certain examples relate to frit materials that substantially melt in about 3 minutes at a temperature of about 525° C. Certain examples relate to a method of making an edge seal by using IR energy. Certain examples relate to adjusting the IR energy applied to a frit material to form an edge seal. Certain examples also relate to making a VIG unit by applying IR energy and adjusting the amount of IR energy over multiple periods of time, e.g., in an oscillating manner.

14 Claims, 10 Drawing Sheets

(56) References Cited

U.S. PATENT DOCUMENTS

| | | | |
|---|---|---|---|
| 6,383,580 B1 | 5/2002 | Aggas | |
| 6,399,169 B1 | 6/2002 | Wang et al. | |
| 6,444,281 B1 | 9/2002 | Wang et al. | |
| 6,503,583 B2 | 1/2003 | Nalepka et al. | |
| 6,541,083 B1 | 4/2003 | Landa et al. | |
| 6,635,321 B2 | 10/2003 | Wang et al. | |
| 6,641,689 B1 | 11/2003 | Aggas | |
| 6,692,600 B2 | 2/2004 | Veerasamy et al. | |
| 6,701,749 B2 | 3/2004 | Wang et al. | |
| 6,946,171 B1 | 9/2005 | Aggas | |
| 7,244,480 B2 | 7/2007 | Minaai et al. | |
| 7,425,518 B2 | 9/2008 | Yoshida et al. | |
| 7,435,695 B2 | 10/2008 | Hormadaly | |
| 7,452,489 B2 | 11/2008 | Sawai et al. | |
| 2002/0035852 A1* | 3/2002 | Wang et al. | 65/34 |
| 2005/0001545 A1* | 1/2005 | Aitken et al. | 313/512 |
| 2005/0116245 A1* | 6/2005 | Aitken et al. | 257/99 |
| 2005/0233885 A1 | 10/2005 | Yoshida et al. | |
| 2006/0042748 A1 | 3/2006 | Hasegawa et al. | |
| 2006/0084348 A1* | 4/2006 | Becken et al. | 445/25 |
| 2006/0128549 A1 | 6/2006 | Hormadaly | |
| 2009/0151855 A1* | 6/2009 | Wang et al. | 156/109 |
| 2009/0297862 A1 | 12/2009 | Boek et al. | |
| 2010/0180636 A1* | 7/2010 | Liu et al. | 65/33.5 |
| 2010/0275654 A1 | 11/2010 | Wang | |

FOREIGN PATENT DOCUMENTS

| | | |
|---|---|---|
| EP | 0 013 650 | 7/1980 |
| EP | 0 061 183 | 9/1982 |
| EP | 0 889 010 | 1/1999 |
| EP | 1 281 329 | 3/2003 |
| EP | 1 571 134 | 9/2005 |
| EP | 2 017 236 | 1/2009 |
| JP | 2002-137939 | 5/2002 |
| KR | 10-2010-0004572 | 1/2010 |
| SU | 852811 | 8/1981 |
| SU | 1 578 093 | 7/1990 |
| SU | 1590472 | 9/1990 |
| SU | 1694561 | 11/1991 |
| SU | 1791433 | 1/1993 |
| WO | WO 96/02473 | 2/1996 |
| WO | WO 96/22255 | 7/1996 |
| WO | WO 02/14640 | 2/2002 |
| WO | WO 02/27135 | 4/2002 |
| WO | WO 2006/044383 | 4/2006 |
| WO | WO 2012/035565 | 3/2012 |
| WO | WO 2012/073662 | 6/2012 |

OTHER PUBLICATIONS

"Pb-Free Vanadium-Based Low-Melting Glass Paste: VS-1026"; Hitachi Powered Metals Technical Report No. 7, (2008).
U.S. Appl. No. 12/000,663, filed Dec. 14, 2007; Cooper.
U.S. Appl. No. 12/000,791, filed Dec. 17, 2007, Wang et al.
U.S. Appl. No. 12/453,221, filed May 1, 2009; Wang.
U.S. Appl. No. 12/458,071, filed Jun. 30, 2009; Cooper et al.
International Search Report dated Apr. 9, 2009.
International Search Report dated Jul. 8, 2010.
International Search Report dated Mar. 18, 2009.
U.S. Appl. No. 12/929,875, filed Feb. 22, 2011; Dennis.
U.S. Appl. No. 12/929,876, filed Feb. 22, 2011; Cooper et al.
International Search Report dated May 29, 2012.
International Search Report dated Oct. 2, 2012.

* cited by examiner

MATERIALS AND/OR METHOD OF MAKING VACUUM INSULATING GLASS UNITS INCLUDING THE SAME

FIELD OF THE INVENTION

Certain example embodiments of this invention relate to improved frit materials and/or methods for making vacuum insulted glass (VIG) units including the same. More particularly, certain example embodiments relate to frit materials with increased IR absorption properties, and/or methods of incorporating the same into VIG units.

BACKGROUND AND SUMMARY OF EXAMPLE EMBODIMENTS OF THE INVENTION

Vacuum IG units are known in the art. For example, see U.S. Pat. Nos. 5,664,395, 5,657,607, and 5,902,652, the disclosures of which are all hereby incorporated herein by reference.

FIGS. 1-2 illustrate a conventional vacuum IG unit (vacuum IG unit or VIG unit). Vacuum IG unit 1 includes two spaced apart glass substrates 2 and 3, which enclose an evacuated or low pressure space 6 there between. Glass sheets/substrates 2 and 3 are interconnected by peripheral or edge seal of fused solder glass 4 and an array of support pillars or spacers 5.

Pump out tube 8 is hermetically sealed by solder glass 9 to an aperture or hole 10 which passes from an interior surface of glass sheet 2 to the bottom of recess 11 in the exterior face of sheet 2. A vacuum is attached to pump out tube 8 so that the interior cavity between substrates 2 and 3 can be evacuated to create a low pressure area or space 6. After evacuation, tube 8 is melted to seal the vacuum. Recess 11 retains sealed tube 8. Optionally, a chemical getter 12 may be included within recess 13.

Conventional vacuum IG units, with their fused solder glass peripheral seals 4, have been manufactured as follows. Glass frit in a solution (ultimately to form solder glass edge seal 4) is initially deposited around the periphery of substrate 2. The other substrate 3 is brought down over top of substrate 2 so as to sandwich spacers 5 and the glass frit/solution there between. The entire assembly including sheets 2, 3, the spacers, and the seal material is then heated to a temperature of approximately 500° C., at which point the glass frit melts, wets the surfaces of the glass sheets 2, 3, and ultimately forms hermetic peripheral or edge seal 4. This approximately 500° C. temperature is maintained for from about one to eight hours. After formation of the peripheral/edge seal 4 and the seal around tube 8, the assembly is cooled to room temperature. It is noted that column 2 of U.S. Pat. No. 5,664,395 states that a conventional vacuum IG processing temperature is approximately 500° C. for one hour. Inventors Lenzen, Turner and Collins of the '395 patent have stated that "the edge seal process is currently quite slow: typically the temperature of the sample is increased at 200° C. per hour, and held for one hour at a constant value ranging from 430° C. and 530° C. depending on the solder glass composition." After formation of edge seal 4, a vacuum is drawn via the tube to form low pressure space 6.

The composition of conventional edge seals are known in the art. See, for example, U.S. Pat. Nos. 3,837,866; 4,256,495; 4;743,302; 5,051,381; 5,188,990; 5,336,644; 5,534,469; 7,425,518, and U.S. Publication No. 2005/0233885, the disclosures of which are all hereby incorporated herein by reference.

In certain instances, the aforesaid high temperatures and long heating times of the entire assembly utilized in the formulation of edge seal 4 are undesirable. This is especially the case when it is desired to use a heat strengthened or tempered glass as substrate(s) 2, 3 in the vacuum IG unit. As shown in FIGS. 3-4, tempered glass loses temper strength upon exposure to high temperatures as a function of heating time. Moreover, such high processing temperatures may adversely affect certain low-E coating(s) that may be applied to one or both of the glass substrates in certain instances.

FIG. 3 is a graph illustrating how fully thermally tempered plate glass loses original temper upon exposure to different temperatures for different periods of time, where the original center tension stress is 3,200 MU per inch. The x-axis in FIG. 3 is exponentially representative of time in hours (from 1 to 1,000 hours), while the y-axis is indicative of the percentage of original temper strength remaining after heat exposure. FIG. 4 is a graph similar to FIG. 3, except that the x-axis in FIG. 4 extends from zero to one hour exponentially.

Seven different curves are illustrated in FIG. 3, each indicative of a different temperature exposure in degrees Fahrenheit (° F.). The different curves/lines are 400° F. (across the top of the FIG. 3 graph), 500° F., 600° F., 700° F., 800° F., 900° F., and 950° F. (the bottom curve of the FIG. 3 graph). A temperature of 900° F. is equivalent to approximately 482° C., which is within the range utilized for forming the aforesaid conventional solder glass peripheral seal 4 in FIGS. 1-2. Thus, attention is drawn to the 900° F. curve in FIG. 3, labeled by reference number 18. As shown, only 20% of the original temper strength remains after one hour at this temperature (900° F. or 482° C.). Such a significant loss (i.e., 80% loss) of temper strength may be undesirable.

Further, when the temperature the sheet is exposed to is reduced to 800° F., about 428° C., the amount of strength remaining is about 70%. Finally, a reduction in temperature to about 600° F., about 315° C., results in about 95% of the original temper strength of the sheet remaining. Alternatively, or in addition, a reduced time period of exposure to high temperatures may decrease the temper strength loss. For example, 10 minutes of being exposed to approximately 900° F. may result a temper strength that is 60% to 70% of the original value. As will be appreciated, it may be desirable to reduce any temper strength losses as a result of exposing a tempered sheet of glass to high temperatures.

As noted above, the creation of VIG units includes the creation of a hermetic seal that can withstand the pressure applied from the vacuum created on inside of the unit. As also discussed above, the creation of the seal may conventionally involve temperatures of at or above 500° C. for periods of around one hour. These temperatures are required in order to obtain a high enough temperature for a conventional frit material to melt and form a seal for a VIG unit. As shown above, such a temperature can result in a strength reduction (often times a dramatic strength reduction) for VIG units using tempered glass.

The above temperatures are traditionally achieved through the use of a convection heating process (e.g., an ordinary oven). Such a heating process may be problematic for sealing a frit material between two substrates of glass. For example, the movement of air within a chamber via the convention process may affect the surface temperature of the glass substrates and may adversely affect the sealing process. It will be appreciated that temperature variations in the glass substrate may cause bending, warping, etc. These side effects may then prevent a frit material from forming a sufficient seal on a glass substrate (e.g., because the glass is not flat). In a convection oven the air temperature may be kept within a couple degrees throughout the oven. However, the temperature of a glass substrate may vary more than 10 degrees depending on the placement of a particular portion of the glass within the oven. Further, such temperature variations (and the associated problems) may be more pronounced as the temperature within the oven increases.

One conventional solution that may avoid the above problems is to use an epoxy to seal the substrates together. However, in the case of VIG units, epoxy compositions may be insufficient to hold a seal on a vacuum. Furthermore, epoxies may be susceptible to environmental factors that may further reduce their effectiveness when applied to VIG units.

Another conventional solution is to use a frit solution that contains lead. As is known, lead has a relatively low melting point. Accordingly, temperatures for sealing the VIG units may not need to be as high for other frit materials, and thus the tempering strength of tempered glass substrates may not be reduced by the same amount required for other frit based materials.

Typical lead based frits may contain between about 70% and 80% lead assay by weight. Such frits may have a sealing temperature (e.g., the temperature where the frit melts and bonds to the substrate) between about 400° C. and 500° C.

While lead based frits may resolve certain issues, the usage of lead in the frit may create new problems. Specifically, there may be health consequences as a result of products containing lead. Additionally, certain countries (e.g., in the European Union) may impose strict requirements on the amount of lead that can be contained in a given product. Indeed, some countries (or customers) may require products that are completely lead-free.

Thus, it will be appreciated that non-lead based frits are continuously sought after. Additionally, techniques for creating glass articles with non-lead based frits (e.g., seals) are continuously sought after. The frit material may be designed to allow for reduced temperature sealing such that annealed or tempered glass can be sealed without a substantial detrimental impact on the properties of the glass. Further, as discussed above, temperature variations across the surface of a glass substrate during a sealing processing may adversely affect the quality of the seal that is created. Accordingly, techniques for improving the sealing process for creating a seal or a VIG unit with a seal are continuously sought after.

A frit material according to certain example embodiments may have one or more of the following features and/or advantages:
a. A relatively low melting temperature versus other frits used for VIG units
b. Good glass/frit wetting and adhesion.
c. Sufficient melt flow to have some process tolerance for glass bow and frit height processing variation.
d. Frit melting tolerance for temperature range. Seal forms a reduced amount of bubbles and maintains adequate seal strength.
e. Coefficient of thermal expansion (CTE) match with a range to seal to glass.
f. Seal formed by frit is hermetic.
g. IR absorption properties are high or additives added for maximum use of near IR in an oven.
h. Low frit crystallization or crystallization at higher than sealing temperature to allow frit at sealing temperature to be fluid for wetting and flow ability.
i. Relatively fast bonding time to glass substrates.
j. A mechanical bond strength that is enough to with stand thermal stresses and/or vacuum induced stresses.

In certain example embodiments, a process of forming an edge seal or a VIG unit with an edge seal may include applying IR energy to the frit material. The IR energy may facilitate the melting and/or sealing of the frit material to a glass substrate.

In certain example embodiments a frit material is provided. The frit material includes a composition that includes bismuth oxide, zinc oxide, boric oxide, aluminum oxide, and magnesium oxide in amounts sufficient to absorb at least 80% of infrared (IR) energy having a wavelength of 1100-2100 nm.

In certain example embodiments a frit material is provided. A composition that includes bismuth oxide, zinc oxide, boric oxide, aluminum oxide, and magnesium oxide is included in the frit material. The frit material substantially melts through when the frit is held at a temperature of no greater than 525° C. for no more than about 3 minutes.

In certain example embodiments a method of making an edge seal for a VIG unit is provided. IR energy is applied from at least one IR emitter operating at a first voltage for a first predetermined period of time to a frit material. The operating voltage of the at least one IR emitter is reduced from the first voltage to a second voltage for a second predetermined period of time so as to reduce the IR energy impinging upon the frit material. The operating voltage of the at least one IR emitter is increased from the second voltage to a third voltage for a third predetermined period of time so as increase the IR energy impinging upon the frit material. The frit material is cooled or allowed to cool over a fourth predetermined period of time.

In certain example embodiments, a method of making a VIG unit is provided. A VIG subassembly is exposed to a first base temperature, the VIG subassembly includes first and second substantially parallel spaced apart glass substrates and a frit material is provided around a peripheral edge between the first and second substrates. IR energy is applied to the VIG subassembly so as to increase a temperature of the frit material to melting temperature range, wherein the melting temperature range is no greater than 525° C. The IR energy is maintained energy at the melting temperature range for no more than 5 minutes. A temperature of the at least two glass substrates does not exceed about 475° C. when the IR energy is maintained at the melting temperature range and a temperature difference across the surface of the first and second substrates does not exceed about +/−5° C. until the frit material hardens after reaching the melting temperature.

In certain example embodiments a method of making VIG unit is provided. First and second substantially parallel spaced apart glass substrates are provided with a frit material being provided at a peripheral edge thereof. IR energy is applied from at least one IR emitter operating at a first voltage for a first predetermined period of time to a frit material. The operating voltage of the at least one IR emitter is reduced from the first voltage to a second voltage for a second predetermined period of time so as to reduce the IR energy impinging upon the frit material. The operating voltage of the at least one IR emitter is increased from the second voltage to a third voltage for a third predetermined period of time so as increase the IR energy impinging upon the frit material. The frit material is cooled or allowed to cool over a fourth predetermined period of time.

The features, aspects, advantages, and example embodiments described herein may be combined in any suitable combination or sub-combination to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

The following description is provided in relation to several example embodiments which may share common characteristics, features, etc. It is to be understood that one or more features of any one embodiment may be combinable with one or more features of other embodiments. In addition, single features or a combination of features may constitute an additional embodiment(s).

Figure 2:
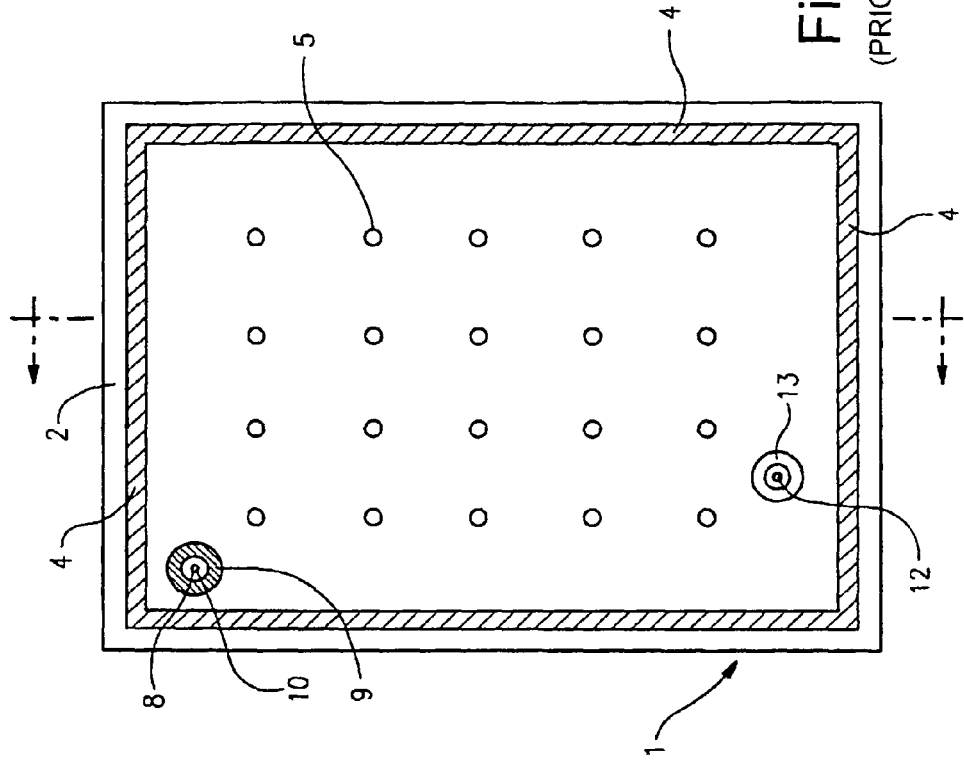
FIG. 2 is a top plan view of the bottom substrate, edge seal, and spacers of the FIG. 1 vacuum IG unit taken along the section line illustrated in FIG. 1.
Figure 1:
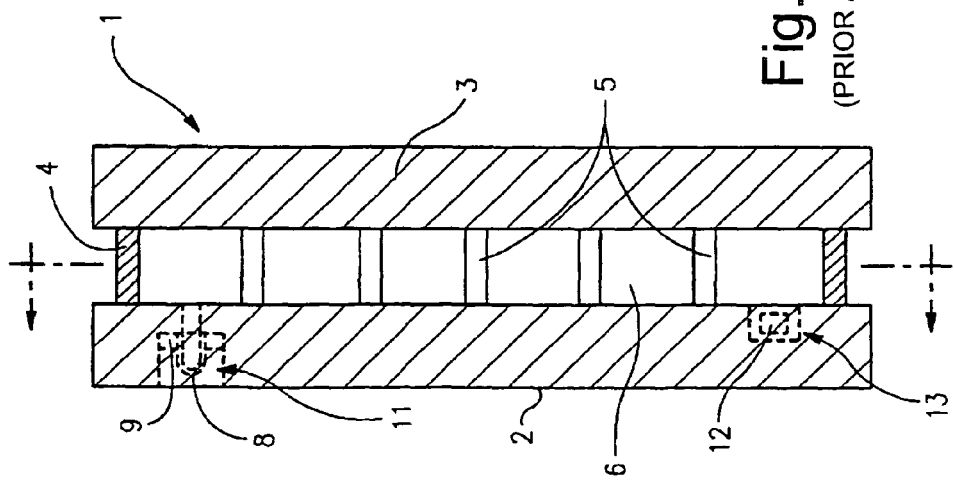
FIG. 1 is a cross-sectional view of a conventional vacuum IG unit.
Figure 3:
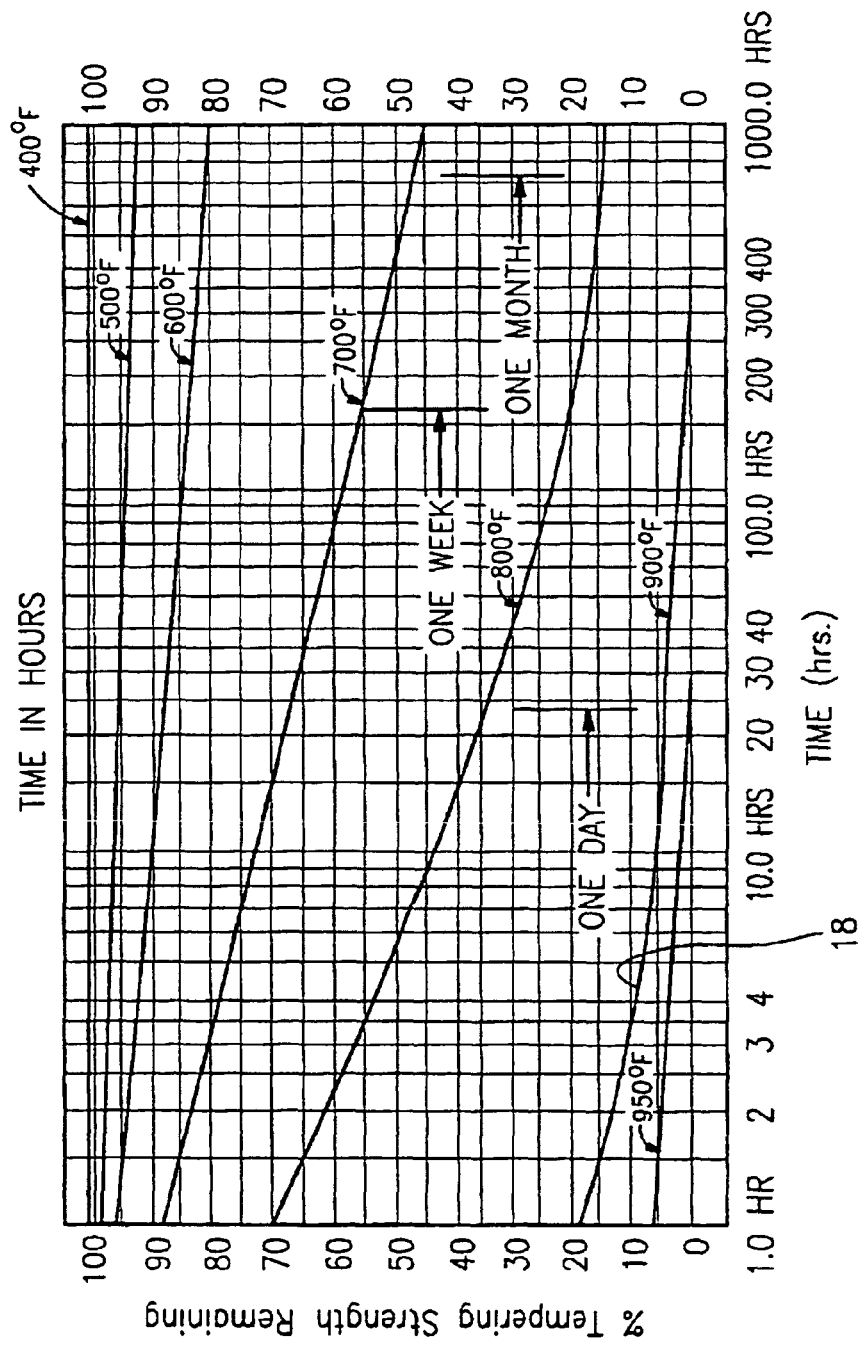
FIG. 3 is a graph correlating time (hours) versus percent tempering strength remaining, illustrating the loss of original temper strength for a thermally tempered sheet of glass after exposure to different temperatures for different periods of time.
Figure 4:
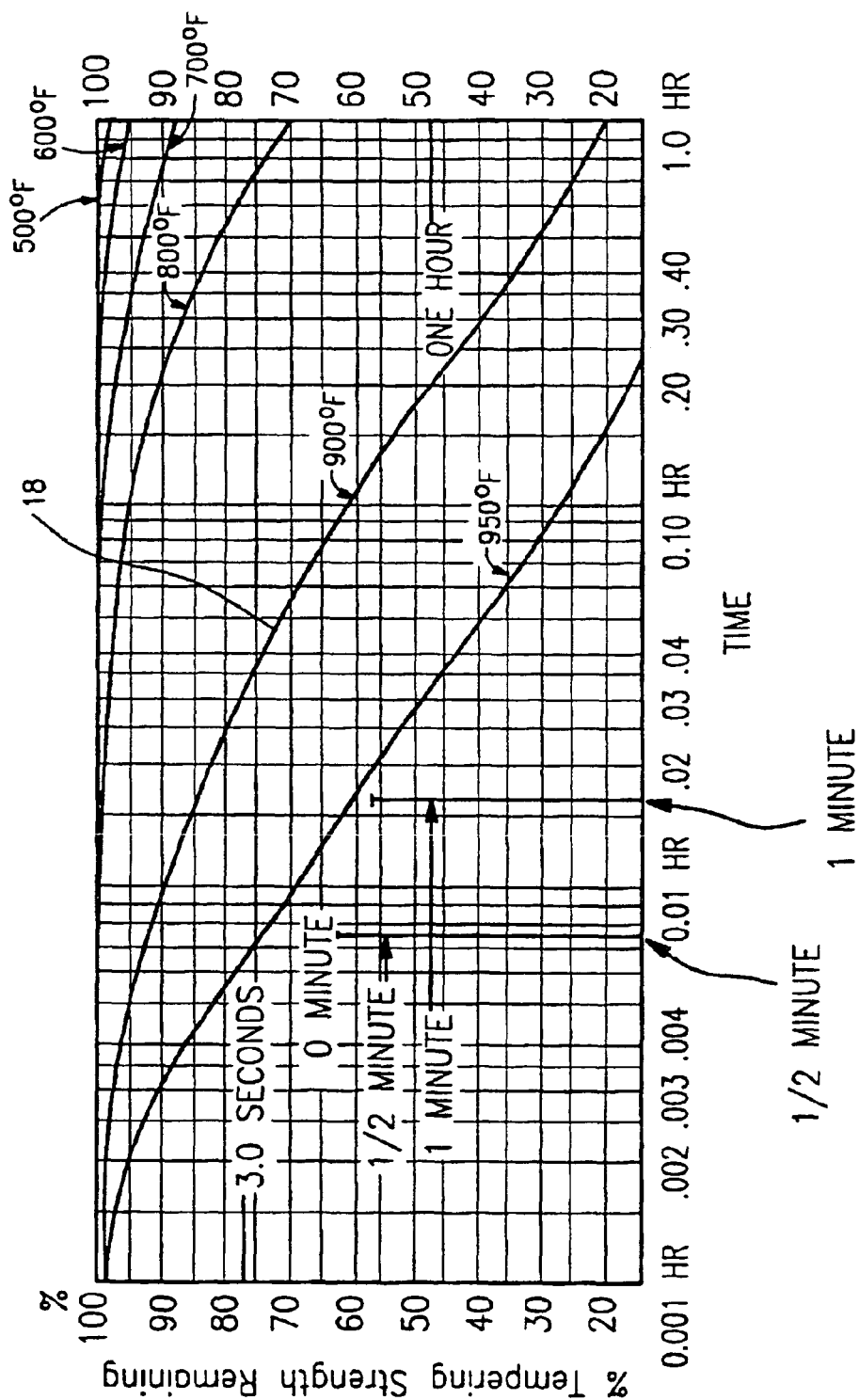
FIG. 4 is a graph correlating time versus percent tempering strength remaining similar to that of FIG. 3, except that a smaller time period is provided on the x-axis.
Figure 5:
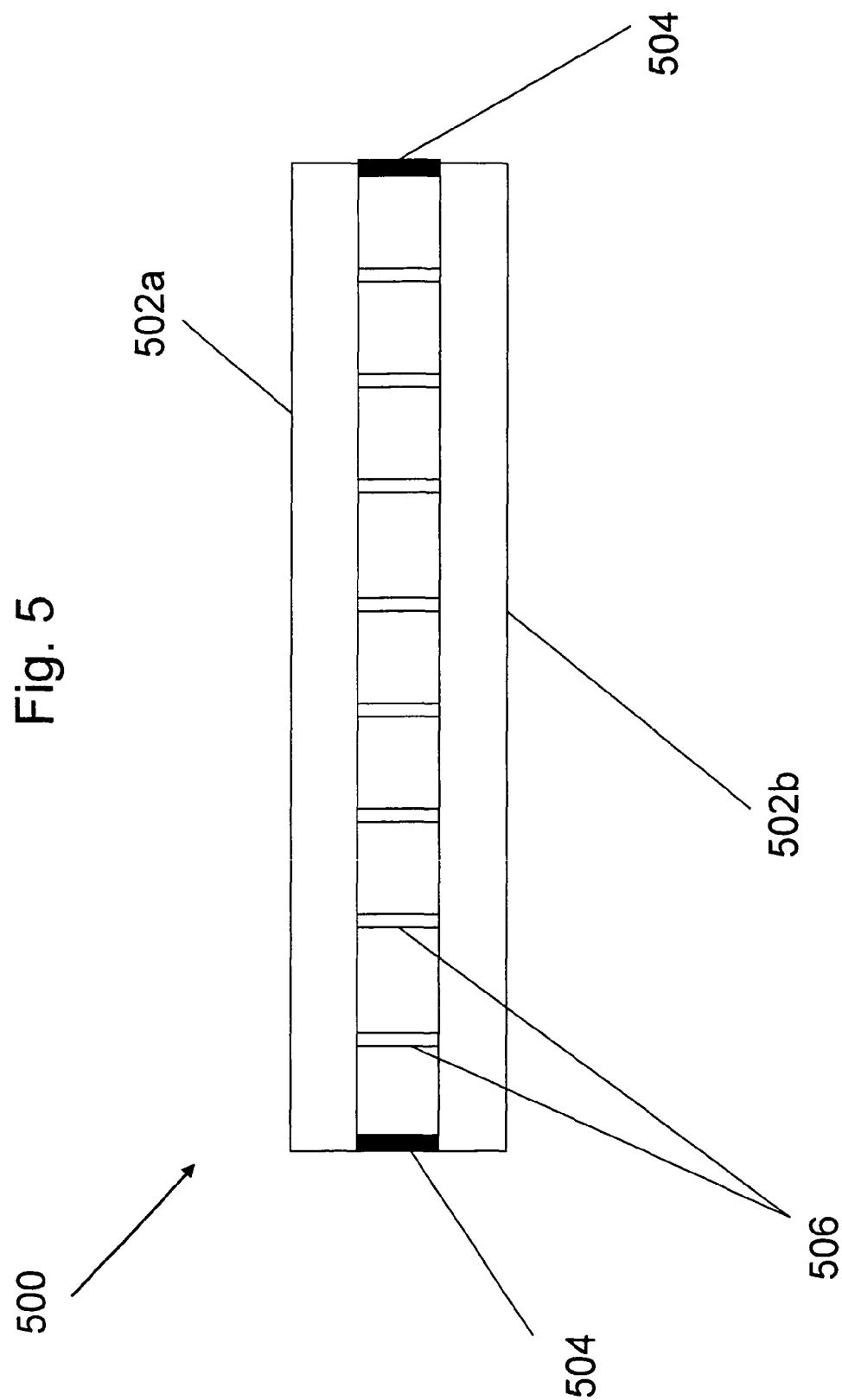
FIG. 5 is cross-sectional view of a vacuum insulated glass unit according to certain example embodiments.

FIG. 5 is cross-sectional view of a vacuum insulated glass (VIG) unit according to certain example embodiments. VIG unit 500 may include first and second glass substrates 502a and 502b that are spaced apart and define a space therebetween. The glass substrates 502a and 502b may be connected via an improved seal 504. Support pillars 506 may help maintain the first and second substrates 502a and 502b in substantially parallel spaced apart relation to one another. It will be appreciated that the CTE of the improved seal 504 and the glass substrates 502a and 502b may substantially match one another. This may be advantageous in terms of reducing the likelihood of the glass cracking, etc. Although FIG. 5 is described in relation to a VIG unit, it will be appreciated that the improved seal 504, may be used in connection with other articles and/or arrangements including, for example, insulating glass (IG) units and/or other articles.

The improved frit material may be adjusted to improve CTE, wetting, and/or bonding properties such that the frit cooperates with an underlying substrate (e.g., a glass substrate). Such adjustments may be provided by altering the composition of the base materials (described in greater detail below) and/or by introducing one or more additives therein.

In certain example embodiments, an improved seal may be based on a frit material derived from frit 2824 produced and commercially available from the Ferro Corporation. Such a frit may include Zinc Oxide, Boric Oxide, Aluminum Oxide, and Magnesium Oxide. The inventor of the instant application designed a modified version of the above frit. For instance, in certain example embodiments, the conventional component ratios of the 2824 frit may be adjusted to produce lower melting temperatures. In certain example embodiments, the frit may include further metallic oxide(s) composition(s) or powder(s) to enhance the absorption properties of the frit in the infrared (IR) wavelength range, or a portion thereof. In certain example embodiments, the short range infrared absorption (especially at or around the approximately 1100 nm peak wavelength) may be improved over the base frit. Alternatively, or in addition, the medium IR absorption (especially at or around the approximately 1600 nm peak energy) may be improved over the base frit.

Figure 6:
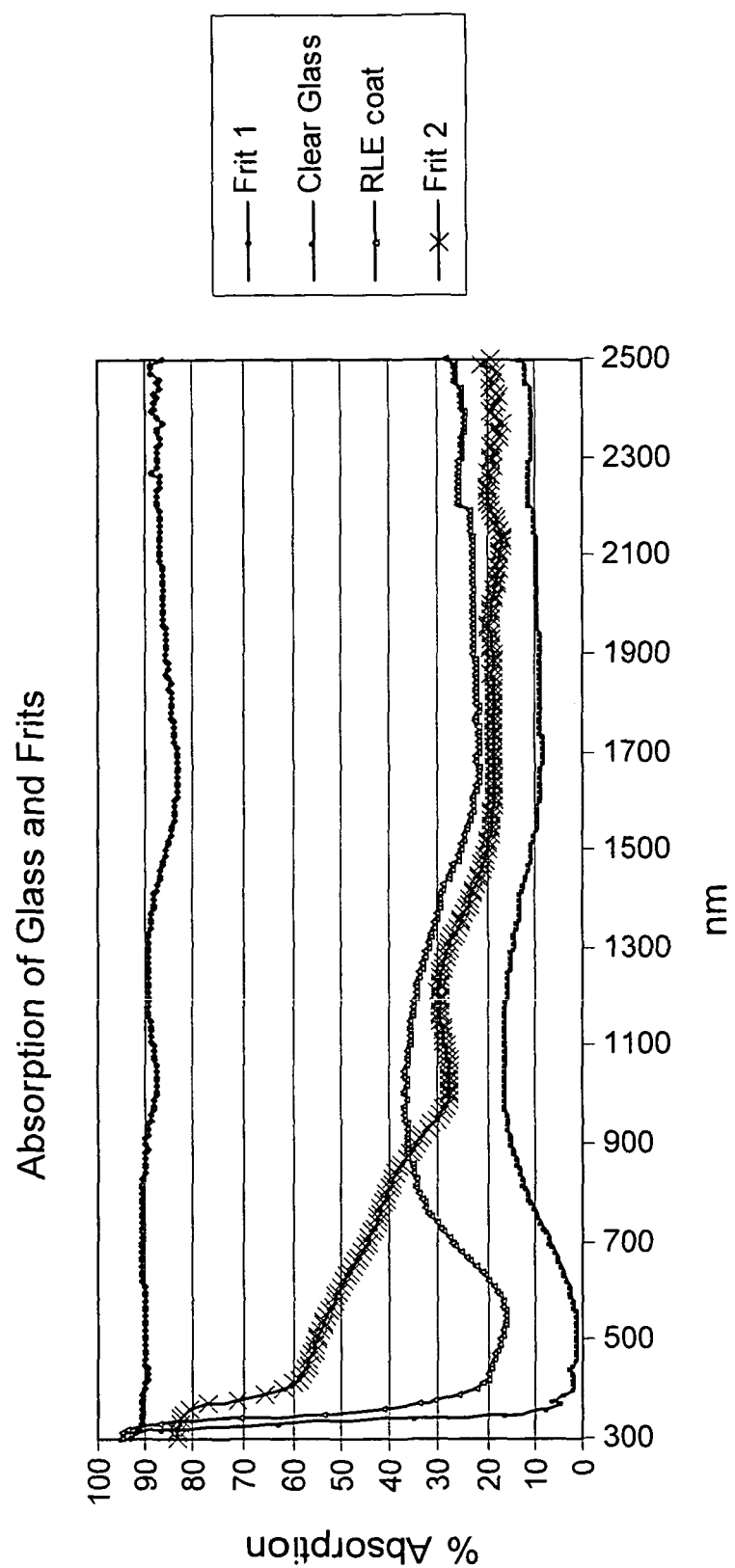
FIG. 6 is an illustrative graph showing absorption properties according to certain example embodiments.

FIG. 6 shows an illustrative graph with absorption properties of a frit material according to certain example embodiments. The illustrative graph shows absorption percentage versus wavelength in nanometers. Two different frit materials are shown, frit 1 and frit 2. Frit 1 is an improved frit material according to certain example embodiments, and frit 2 is a conventional frit material. Also shown are two different types of glass. The first is a conventional clear float glass. The second (RLE glass) is a coated glass substrate. As can be seen from the graph, frit 1 includes increased absorption properties versus frit 2. Indeed, frit 1 maintains an absorption percentage above 80% for the length of the illustrated graph and at or near 90% for a substantial portion of the graph. Conversely, frit 2 has a maximum absorption in the 300 nm wavelength range and subsequently drops off quickly until maintaining about 20% absorption in the medium to long wave length IR regions.

As shown, frit 2 possesses absorption properties similar to those found in the glass substrates. Accordingly, when frit 2 is disposed on such glass substrates, both the glass and the frit may absorb similar amounts of IR energy. The similar absorption properties of the IR energy may lead to both the frit and the glass substrates having similar heating profiles. In contrast, the absorption properties of frit 1 provide a substantially increased ability to absorb IR energy. Accordingly, in certain example embodiments, a frit material with a high IR absorption percentage may be provided, for example above about 80%, or preferably above 85%, and even more preferably above about 90%, for at least a substantial portion of the IR wavelengths in question.

Improved frits based on the 2824 frit from Ferro Corporation may include modifications designed by the inventor of the instant application. Frit 2824B, based on the 2824 frit, may be used for fast sealing with either short or medium IR energy. Frit 2824B may have an increased absorption property over the substrate upon which it is disposed. As such, the temperature of the frit material may be about 20° C.-75° C. above the temperature of the glass during the IR heating process. Accordingly, with the 2824B frit, when IR energy is applied to the frit material (and the substrate where the frit is disposed) the heat up and sealing time may be between about 10 to 15 minutes with a maximum temperature held between about 1 to 3 minutes. In certain example embodiments, the peak frit temperature (e.g., the melting point) of the 2824B frit may be about 475° C.-485° C. Such a temperature may facilitate the creation of a bonding seal with the underlying substrate. Additionally, such a temperature may facilitate increased overall strength in the fired frit and a relatively consistent structure throughout the fired frit.

Figure 7:
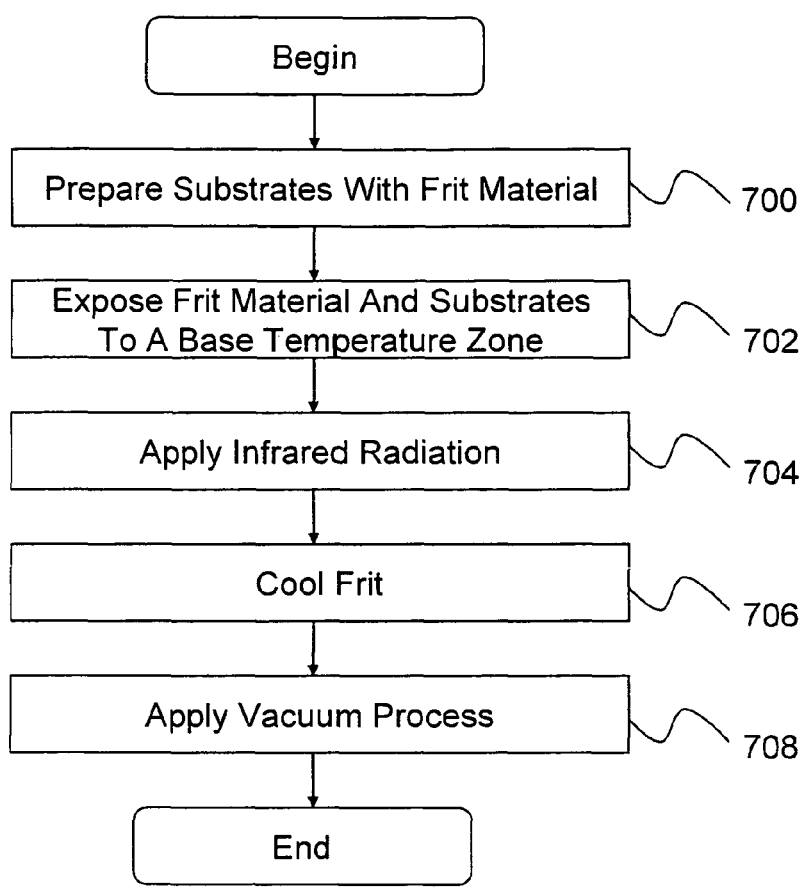
FIG. 7 is a flowchart illustrating a process for making a vacuum insulated glass unit according to certain example embodiments.

Alternatively, or in addition to the 2824B frit, the 2824G frit, also based on a modification to the 2824 frit from Ferro Corporation, may be used as the fit material for the process described in FIG. 7. Frit 2824G may be useful for fast sealing using either short or medium IR energy to heat the substrate and the frit material. Frit 2824G may have a relatively increased absorption property for IR energy over the substrate (e.g., a tempered glass substrate) upon which it is disposed. Accordingly, the temperature of the 2824G frit may be between 25° C.-75° C. above the temperature of the substrate when employed with a heating process according to certain example embodiments. In certain example embodiments, a temperature of about 510° C. may facilitate a bonding seal without forming degradation or outgassing in the frit system. In certain example embodiments, the above or other temperature ranges may be maintained for between about 1 and 5 minutes. In certain example embodiments, the 2824G frit may have an improved resistance to glass crystallization during the heating process. The 2824G frit may also be used with a more conventional heating process (e.g., including furnace heating or oven firing heating in a convection-based apparatus) where the sealing and process occurs over a period of between about 5 to 10 hours. In these instances, the sealing temperature may be between about 480° C. to 490° C. when the frit material is held for one hour at a predetermined peak temperature.

Certain example embodiments may include a frit material disclosed in co-pending U.S. application Ser. No. 12/929, 875, entitled "VANADIUM-BASED FRIT MATERIALS, AND/OR METHODS OF MAKING THE SAME" the entire contents of which are hereby incorporated by reference.

FIG. 7 is a flowchart illustrating a process for making a vacuum insulated glass unit according to certain example embodiments. In step 700 a glass substrate may be prepared with an exemplary frit material (e.g., Frit 1 shown in FIG. 6).

As explained above, VIG units may include a plurality of pillars disposed between the two glass substrates. Furthermore, as also explained above, in certain example embodiments, it may be desirable to have a short seal time for the frit material as a bond is formed with the glass substrates. In certain example embodiments, a side-effect of the short seal time for the frit material may be little or no flow for the frit material during the bonding process. Thus, in such instances, it may not be possible to have the glass substrates settle to the height of the pillars due to the fluid flow (or lack thereof) of the improved frit material. Accordingly, the height of the frit as it is disposed on the glass substrates may be controlled within a certain margin (e.g., to a height greater than the pillar height). In certain example embodiments, the frit may be disposed onto the glass substrate in the form of a dried frit bead. Accordingly, the height of the bead may be determined to be within a certain range. Thus, during the frit melting process the frit may be allowed to melt down to the height of the pillars and thus allow the glass substrates to settle against the pillars. In certain example embodiments, frit particles may condense between about 25% and 75%, or in certain instances between about 50% and 60% of the dried frit height (e.g., before melting). Accordingly, with a pillar height of 0.25 mm and a condense percentage of between 50% and 60% the dried frit height may be between about 0.5 mm and 0.6 mm.

It will be appreciated that clamping the glass substrates together (or applying some other external force) may address the above discussion. However, in a production environment, for example described in co-pending application 12/929,876 entitled "LOCALIZED HEATING TECHNIQUES INCORPORATING TUNABLE INFRARED ELEMENT(S) FOR VACUUM INSULATING GLASS UNITS, AND/OR APPARATUSES FOR THE SAME" , the entire contents of which are hereby incorporated by reference, such a solution may not be feasible (e.g., as there is conveyor and/or using a clamp may create inefficiencies in the production process).

After the frit material is prepared and disposed onto a substrate, the frit and the substrate(s) may be exposed to a base temperature zone in step 702. In certain example embodiments, the base temperature zone may include a base temperature of about between 50° C. and 300° C., preferably between about 75° C. and 250° C., and more preferably between about 100° C. and 200° C. In certain example embodiments, the base temperature zone may be implemented through a standard convention process or other-heating means. A heating chamber may be used that provide a substantially uniform temperature. The heating chamber may be insulated to, for example, reduce heat loss from the chamber while the frit and glass substrates are within the chamber.

As noted above, air movement may result in non-uniform temperatures across the surface of the glass substrates. This in turn may cause undesirable warping or the like on the glass substrates. Thus, for a convention process techniques for reducing air movement may be implemented in order to provide a more stable temperature environment for the glass substrates. Accordingly, in certain example embodiments, fans (as part of a convection process) may be turned off at this point in the process. Further, the glass article may be allowed to sit while the air flow stabilizes (e.g., becomes stagnate).

Next, in step 704, the frit material and the glass substrates may be exposed to infrared radiation from an IR heating element. In certain example embodiments, the IR heating element may include multiple IR lamps. For example, certain example embodiments may include three or more zones of IR lamps that are individually controlled. Co-Pending Application 12/929,876 entitled "LOCALIZED HEATING TECHNIQUES INCORPORATING TUNABLE INFRARED ELEMENT(S) FOR VACUUM INSULATING GLASS UNITS, AND/OR APPARATUSES FOR SAME" , the entire contents of which are hereby incorporated by reference, discloses exemplary configurations of IR lamps according to certain example embodiments.

As noted above, in certain example embodiments, exemplary frit material may be designed to absorb a particular range of IR energy. Accordingly, the IR energy applied in step 704 may be specific (e.g., tuned) to a certain frit composition. For example, the IR energy applied may be short IR (with an approximately 1100 nm peak wavelength). Alternatively, or in addition, the IR applied may be medium IR (approximately 1600 nm peak energy). In certain example embodiments, the frit material may have a broad range of IR absorption. The short, medium, and/or long wave IR may be applied to a given frit material according to certain example embodiments, e.g., depending on the base composition of the frit material and/or any additives introduced thereto.

Figure 8:
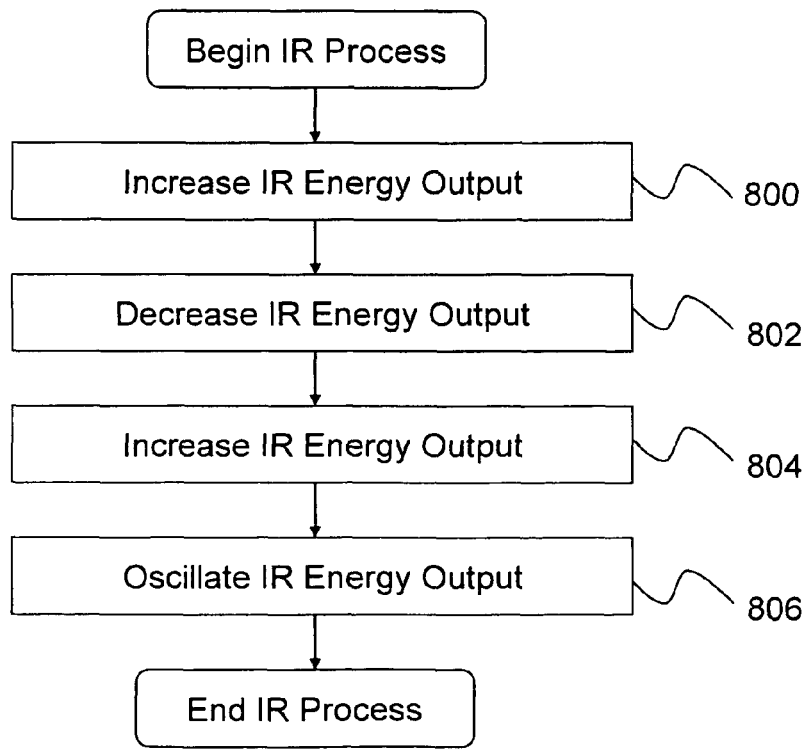
FIG. 8 is a flowchart for an exemplary heating process for applying IR energy to VIG, assembly according certain example embodiments.

The process of applying IR energy from an IR lamp may involve more than applying a set amount of IR energy over a certain period of time. The inventor of the instant application discovered that it may be advantageous to the frit melting, bonding process, and/or other frit properties, to apply a heating profile where energy output from the IR emitters is adjusted over the course of the heating process. FIG. 8 is a flowchart for an exemplary heating process for applying IR energy to VIG assembly according certain example embodiments.

As part of an exemplary IR heat process, in step 800, the IR energy output from IR energy emitters (e.g., lamps) is increased or set to an initial predetermined level. For example, using an IR lamp of about 204 volts the lamp may be set to between 30 and 60% of full power. After a predetermined period of time (e.g., between about 3 and 7 minutes, more preferably between about 4 and 6 minutes, even more preferably about 5 minutes) the IR energy output from the emitters may be decreased to a predetermined level in step 802. This decrease in energy output may be between about 25% and 75% of the level set in step 800. After another predetermined period of time (e.g., between about 1 and 5 minutes, more preferably between about 2 and 4, even more preferably about 3 minutes) in which this second level of IR is applied to the frit and substrate, the energy level is increased to another, third, predetermined threshold in step 804. In certain example embodiments, the increase may be between about 25% and 75% of an increase from the first level of energy. In certain example embodiments, the energy level may return to the energy levels in the first level. In any event, the third level of energy output may be held for another period of time. For example, between about 5 and 10 minutes, preferably between about 6 and 8 minutes, even more preferably about 7 minutes.

After the third modification to the energy output, the IR energy output from the emitters may be made to oscillate between two (or more) thresholds. For example, the IR energy output from the emitters may be set to one level for a period of time, then set to another high level, and then set back to the previous level. This oscillation process may be repeated a predetermined number of times. For example between 1 and 5 times, preferably between about 2 and 4 times, even more preferably about 3 times (e.g., the oscillating levels may start and end on the same level). As noted above, during the oscillation process the energy level may oscillate between two set levels. In certain embodiments, the set levels may vary in a range of about 10% between cycles in the oscillation.

Below, Tables 1 and 2 detail an illustrative heating process according to certain example embodiments for applying energy (e.g., from IR emitters) to a frit material and associated substrates.

TABLE 1

| Step # | Step (Min) | Base Temp | Top Front | Top Middle | Top Back | Bottom Front | Bottom Middle | Bottom Back | Fan (%) | Damp (%) | Total Time |
|---|---|---|---|---|---|---|---|---|---|---|---|
| Init. | NA | 100 C. | 0% | 0% | 0% | 0% | 0% | 0% | 0% | 0% | |
| Ramp | 5 | 0° C. | 50 | 35 | 60 | 59 | 30 | 50 | 0% | 0% | 5.0 |
| Hold | 3 | 0° C. | 32 | 15 | 43 | 40 | 9 | 33 | 0% | 0% | 8.0 |
| Ramp | 7 | 0° C. | 76 | 50 | 83 | 78 | 48 | 80 | 0% | 0% | 15.0 |
| Off | 0.1 | 0° C. | 10 | 10 | 10 | 10 | 10 | 10 | 0% | 0% | 15.1 |
| On | 0.5 | 0° C. | 65 | 50 | 65 | 65 | 50 | 65 | 0% | 0% | 15.6 |
| Off | 0.1 | 0° C. | 10 | 10 | 10 | 10 | 10 | 10 | 0% | 0% | 15.7 |
| On | 0.5 | 0° C. | 65 | 50 | 65 | 65 | 50 | 65 | 0% | 0% | 16.2 |
| Off | 0.1 | 0° C. | 10 | 10 | 10 | 10 | 10 | 10 | 0% | 0% | 16.3 |
| On | 0.5 | 0° C. | 65 | 50 | 65 | 65 | 50 | 65 | 0% | 0% | 16.8 |
| Cool | 2.0 | 0° C. | 20 | 0 | 5 | 15 | 0 | 5 | 0% | 100% | 18.8 |
| Cool | 15.0 | 0° C. | 5 | 0 | 5 | 5 | 0 | 5 | 50% | 100% | 33.8 |
| Half IR | 1.0 | 0° C. | 0 | 0 | 0 | 0 | 0 | 0 | 0 | 100% | 34.8 |

TABLE 2

| Step # | Step (Min) | Base Temp | Top Front | Top Middle | Top Back | Bottom Front | Bottom Middle | Bottom Back | Fan (%) | Damp (%) | Total Time |
|---|---|---|---|---|---|---|---|---|---|---|---|
| Init. | NA | 275 C. | 0% | 0% | 0% | 0% | 0% | 0% | 0% | 0% | |
| Ramp | 5 | 0° C. | 50 | 38 | 60 | 59 | 30 | 50 | 0% | 0% | 5.0 |
| Hold | 3 | 0° C. | 32 | 15 | 43 | 40 | 9 | 33 | 0% | 0% | 8.0 |
| Ramp | 7 | 0° C. | 76 | 46 | 83 | 78 | 45 | 80 | 0% | 0% | 15.0 |
| Off | 0.1 | 0° C. | 10 | 10 | 10 | 10 | 10 | 10 | 0% | 0% | 15.1 |
| On | 0.5 | 0° C. | 65 | 40 | 65 | 65 | 40 | 65 | 0% | 0% | 15.6 |
| Off | 0.1 | 0° C. | 10 | 10 | 10 | 10 | 10 | 10 | 0% | 0% | 15.7 |
| On | 0.5 | 0° C. | 65 | 40 | 65 | 65 | 40 | 65 | 0% | 0% | 16.2 |
| Off | 0.1 | 0° C. | 10 | 10 | 10 | 10 | 10 | 10 | 0% | 0% | 16.3 |
| On | 0.5 | 0° C. | 65 | 40 | 65 | 65 | 40 | 65 | 0% | 0% | 16.8 |
| Cool | 2.0 | 0° C. | 20 | 0 | 5 | 15 | 0 | 5 | 0% | 100% | 18.8 |
| Cool | 15.0 | 0° C. | 5 | 0 | 5 | 5 | 0 | 5 | 50% | 100% | 33.8 |
| Half IR | 1.0 | 0° C. | 0 | 0 | 0 | 0 | 0 | 0 | 0 | 100% | 34.8 |

As seen in the above tables, the energy output varies at certain points in the heating process. The exemplary processes shown in Table 1 and 2 are based on the frit 2824G mentioned above and may be applied to tempered glass and/or tempered coated glass substrates. In certain example embodiments, the process shown in Tables 1 and 2 may employ six banks of IR energy lamps. For example, three of the banks may be placed underneath the glass article (Bottom Front, Bottom Middle, and Bottom Back) and three banks may be place over the glass article (Top Front, Top Middle, Top Back). In certain example embodiments, the voltage of the IR lamps may be between about 150 and 250 volts, preferably about 175 and 225 volts, and even more preferably between about 190 and 210 volts. However, it will be appreciated that other voltages of IR lamps may be employed if similar energy outputs are achieved. The example process detailed in Table 1 included IR lamps with a voltage of about 204 volts at 100% power. Thus, as shown in Tables 1 and 2, the process varies the voltage output of the lamps on a percentage basis (e.g., 60% of full power).

It will be appreciated that in a substantially insulated environment that after the initial heat-up process (the first row of data in tables 1 and 2) that the oven may then be turned off and the initial temperature may be kept relatively constant by an insulated chamber and/or the application of energy from the IR lamps. The "Damp" column indicates a damper percentage where 100% indicates that the damper mechanism is pulling in about 100% of allowable outside air into the heat chamber (e.g., to more quickly cool down the items in the chamber). This external airflow may improve the cool down process of the glass substrates and corresponding frit material. Similarly, the "Fan" column indicates usage of a fan to further improve the transfer of heated air from the chamber to the outside air. An example cooling process is explained in greater detail below.

Returning once again to the example process shown in the flowchart of FIG. 7, after applying IR energy in step 704, the frit is cooled and/or allowed to cool in step 706. As noted above, the cooling process may involve opening a damper to allow outside air to cool the frit material. Alternatively, or in addition, a fan may be activated. The cooling process may allow the frit to harder and form a hermetic seal around the periphery of the two glass substrates. Accordingly, once the frit is cooled, a vacuum process may be applied to the VIG assembly in step 708 to remove gas from the interior of the VIG assembly. Thus, a VIG unit is created.

As noted above, it may be desirable for a glass substrate to maintain heat treated (e.g., temper) strength. Accordingly, it may be advantageous to reduce the amount of time a tempered glass substrate is subjected to temperatures that may cause a loss in tempering strength.

Figure 9:
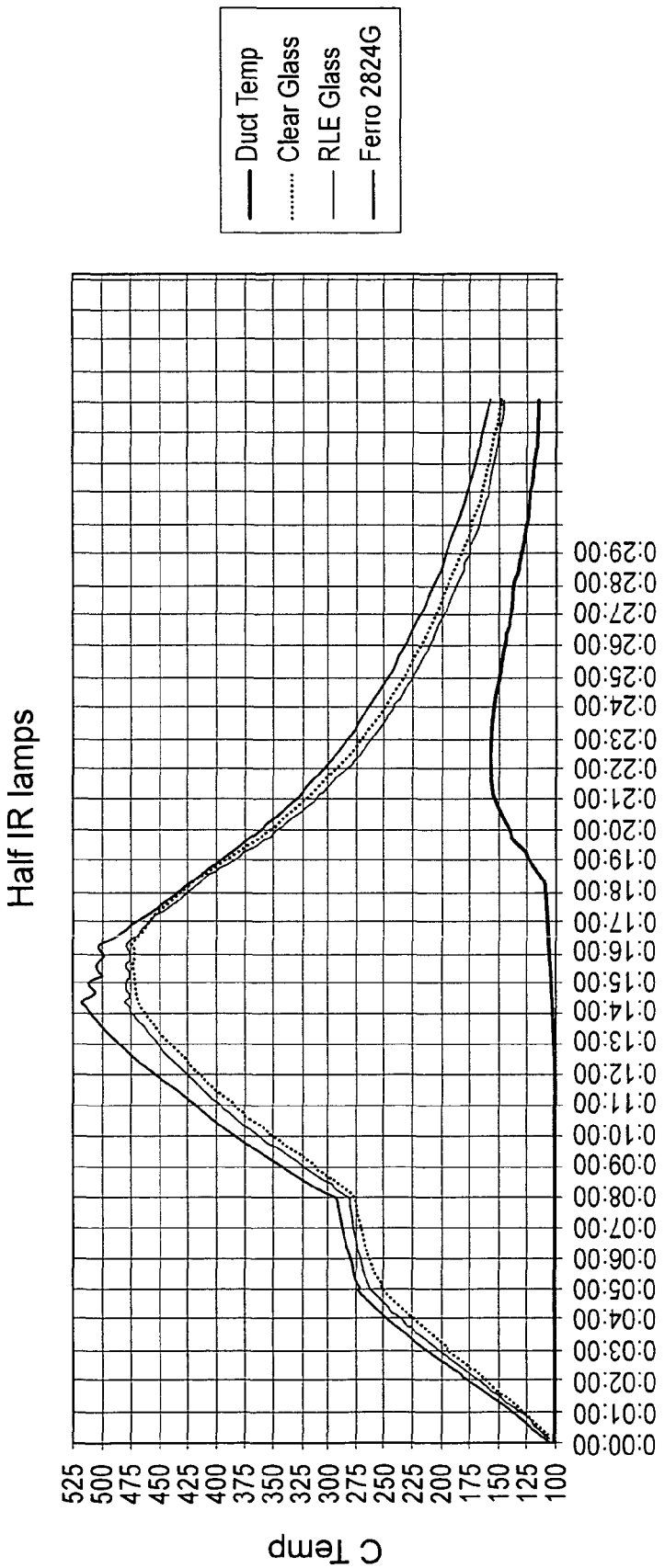
FIG. 9 is a graph illustrating the temperatures of the components of an IG unit during an example process according certain example embodiments.

FIG. 9 is a graph illustrating the temperatures of different components of a VIG assembly during the above process shown in FIG. 7 and Tables 1 and/or 2. The duct temp represents the temperature of the chamber in which the frit material and substrates are placed. The top line in the graph represents the previously mentioned 2824G frit. Also shown are two illustrative glass substrates. The first is conventional clear glass. The second is a conventional coated glass substrate. As shown from the graph, the frit material peaks at around 515° C. At about the same point in time the conventional glass substrates have a recorded temperature on their respective surfaces of about 475° C. As shown in FIG. 9, the glass substrates maintain this temperature for between two and three minutes. After the IR energy output is reduced, the frit and the glass substrates begin to cool down. Accordingly, certain example embodiments may expose the glass substrates of a VIG assembly to a temperature of about 475° C. for between about one minute and five minutes, preferably no more than 4 minutes.

As the heating process may be shorter than a conventional heating process, the time period that a frit has to melt and bond with a glass substrate may be shorter than is conventional for edge seals. Accordingly, in certain example embodiments the frit material may be formulated such that it solidifies and bonds to the glass substrate relatively quickly upon cool-down.

Figure 10:
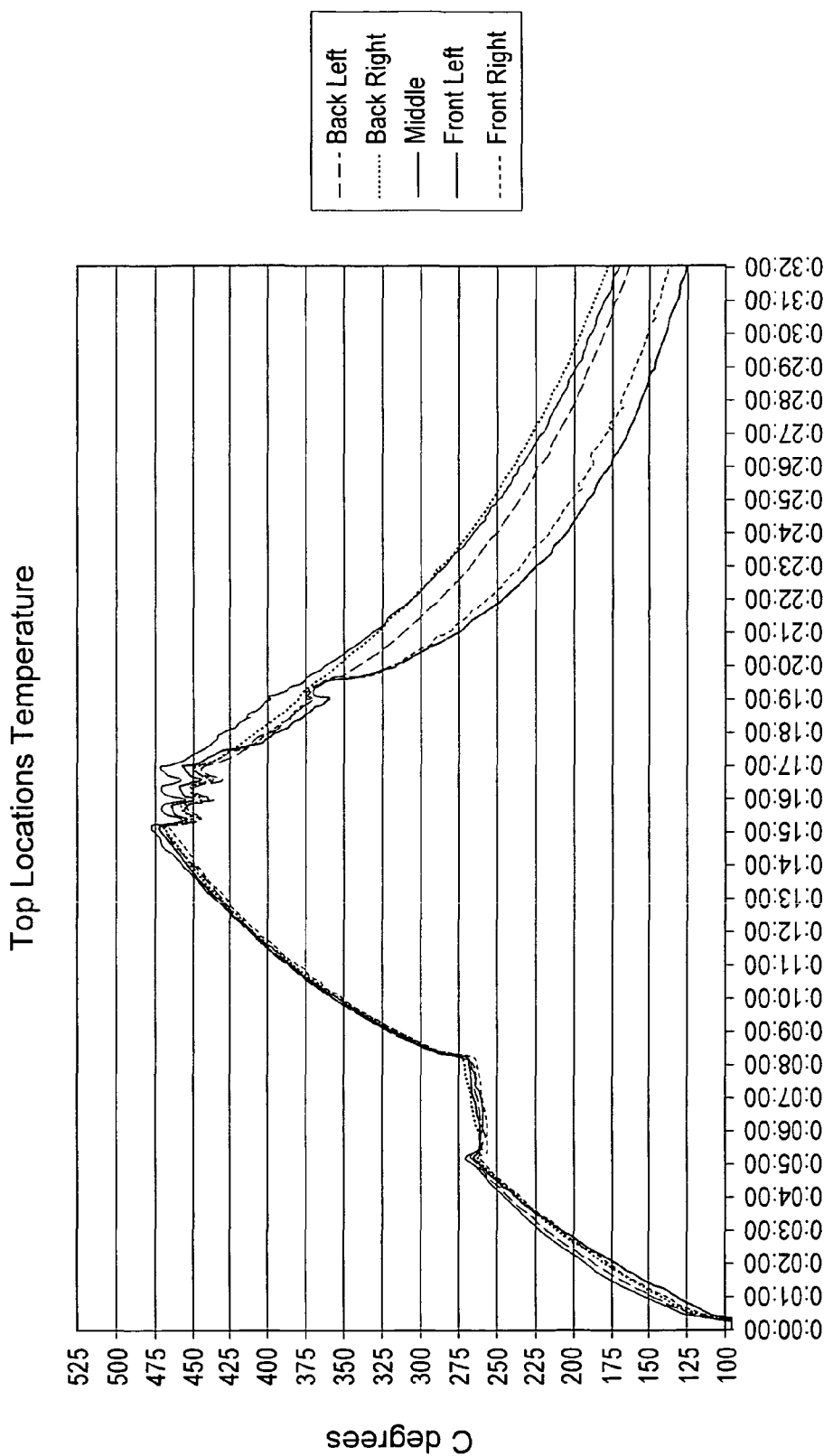
FIGS. 10-12 are graphs illustrating the temperatures of different locations of an IG unit during an example process according to certain example embodiments.
Figure 11:
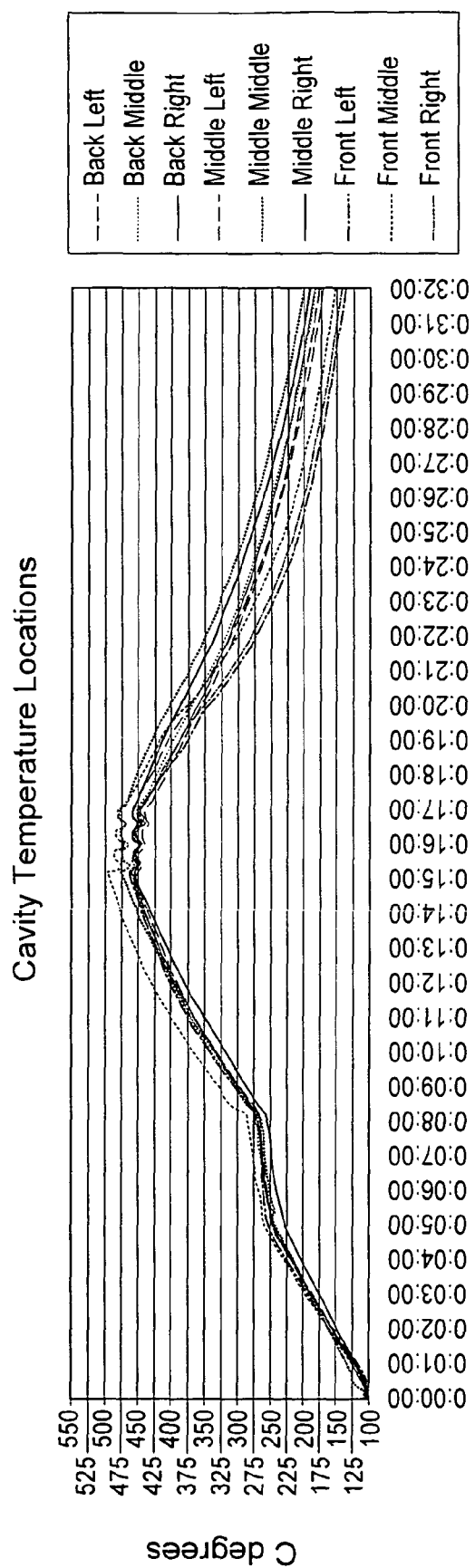
Figure 12:
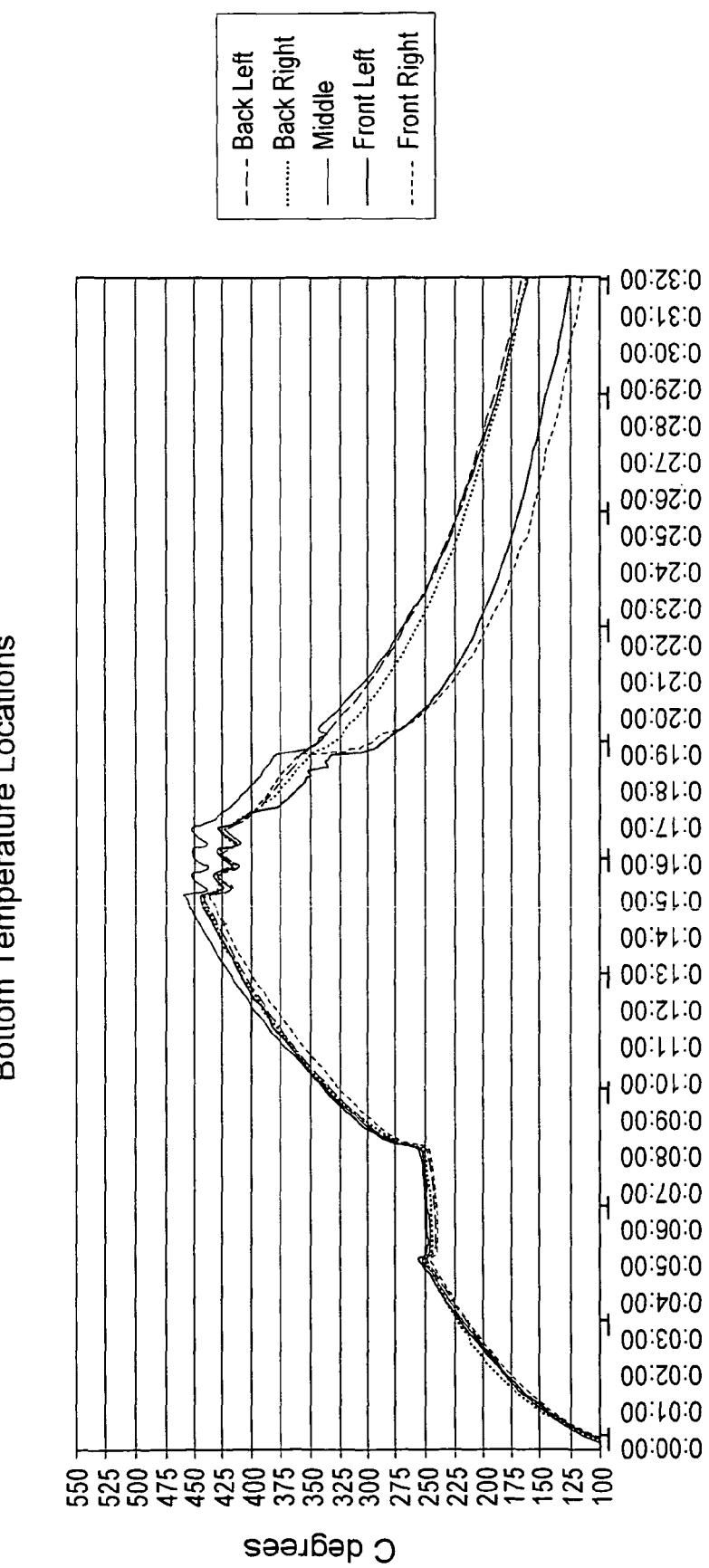

As noted above, the temperature on the surface of a glass substrate may vary over the surface of the substrate. In certain instances, when this differential becomes too large the glass substrate may bend, warp, etc. FIGS. 10-12 show a monitored temperature of certain glass substrates according to the heating process described in FIG. 7 and shown in Tables 1 and/or 2. The monitored temperatures for FIGS. 10-12 include the Back Left portion of the glass substrates, the Back Right, the Middle, the Front Left, and the Front Right. The monitored temperature includes the "top" portion of the two glass substrates (FIG. 10), the cavity portion between the two glass substrates (FIG. 11), and the "bottom" portion of the two glass substrates (FIG. 12). The cavity graph, FIG. 11, includes extra readings from the surface of the glass (e.g., Back Middle).

In certain example embodiments, the heating process described above may facilitate a relatively uniform temperature across the surface of the glass substrates. In certain example embodiments, the temperature across the surface of the glass substrates may be within a range of +/−10° C., preferably about +/−5° C., still more preferably +/−3° C., and even more preferably about +/−2° C.

A side effect of rapidly cooling the frit and the substrate may be seen in FIG. 12 (e.g., the divergence of the Front Left and Right from the Back Left and Right at around 19 minutes). Such a temperature differential may create stresses on the glass substrate. However, in the cooling process the glass substrate may be solidified to the frit material. Thus, the frit material may act as an additional reactive force to prevent warping, bending, or the like in the glass substrate as it cools down. It will be appreciated that this bonding is not present during the heating up process (e.g., because the frit has yet to melt). Accordingly, maintaining a more narrow range of temperature divergence across the surface of the glass may be more desirable on the heating up phase than the cool down phase.

As used herein, the terms "on," "supported by," and the like should not be interpreted to mean that two elements are directly adjacent to one another unless explicitly stated. In other words, a first layer may be said to be "on" or "supported by" a second layer, even if there are one or more layers there between.

It will be appreciated that "peripheral" and "edge" seals herein do not mean that the seals are located at the absolute periphery or edge of the unit, but instead mean that the seal is at least partially located at or near (e.g., within about two inches) an edge of at least one substrate of the unit. Likewise, "edge" as used herein is not limited to the absolute edge of a glass substrate but also may include an area at or near (e.g., within about two inches) of an absolute edge of the substrate(s).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the claims.

What is claimed is:

1. A method of making an edge seal for a VIG window unit, the method comprising:

applying IR energy from at least one IR emitter operating at a first voltage for a first predetermined period of time of from 3-7 minutes to a frit material, wherein the frit material along with a plurality of spacers are located between first and second substrates;

after the period of time of from 3-7 minutes, reducing the operating voltage of the IR emitter from the first voltage to a second voltage for a second predetermined period of time of from 2-4 minutes so as to reduce the IR energy impinging upon the frit material, the second voltage being between 25% and 75% of the first voltage;

after the second period of time of from 2-4 minutes, increasing the operating voltage of the IR emitter from the second voltage to a third voltage for a third predetermined period of time of from 6-8 minutes so as increase the IR energy impinging upon the frit material;

after the third period of time of from 6-8 minutes, oscillating the operating voltage of the IR emitter between a first threshold and a second threshold at least two times in forming the edge seal; and cooling or allowing the frit material to cool over a fourth period of time in making the VIG window unit.

2. The method of claim 1, wherein the first predetermined period is between 3 and 6 minutes.

3. The method of claim 1, wherein the fourth period of time is less than 30 minutes.

4. The method of claim 3, wherein the fourth period of time is less than 20 minutes.

5. The method of claim 1, wherein the frit material has an IR absorption percentage of at least 80% in a wavelength range of between 1100-2100 nm.

6. A method of making a VIG unit, the method comprising:
providing first and second substantially parallel spaced apart glass substrates, a frit material being provided at a peripheral edge thereof; and
forming an edge seal in accordance with the method of claim 1.

7. The method of claim 6, wherein the first predetermined period of time is between about 4 and 6 minutes.

8. The method of claim 6, wherein a temperature differential across the first and second glass substrates does not exceed +/−3° C. during the first, second, and third periods of time.

9. The method of claim 6, wherein the VIG subassembly includes a plurality of support pillars disposed between the glass substrates.

10. The method of claim 9, wherein the frit material is at least initially disposed to a height greater than a height of the pillars.

11. The method of claim 1, wherein the frit material comprises bismuth oxide, zinc oxide, boric oxide, aluminum oxide and magnesium oxide in amounts sufficient to absorb at least 80% of infrared (IR) energy having a wavelength of 1100-2100 nm.

12. A method of making an edge seal for a VIG window unit, the method comprising:
applying a first IR energy from at least one IR emitter to a frit material for a first predetermined period of time of between about 3 and 6 minutes, wherein the frit material along with a plurality of spacers are located between first and second substrates, wherein the frit material comprises bismuth oxide, zinc oxide, boric oxide, aluminum oxide and magnesium oxide in amounts sufficient to absorb at least 80% of infrared (IR) energy having a wavelength of 1100-2100 nm;

after applying the first IR energy, applying a second IR energy from the at least one IR emitter to the frit material for a second predetermined period of time of between about 1 and 5 minutes so as to reduce the temperature of the frit material;

after applying the second IR energy, applying another IR energy different than at least the second IR energy from the at least one IR emitter to the frit material for a third predetermined period of time of between about 5 and 9 minutes so as increase the temperature of the frit material compared to the temperature of the frit material resulting from the second IR energy; and after applying the another IR energy, cooling and/or allowing the frit material to cool over a fourth period of time in making the VIG window unit.

13. The method of claim 12, wherein said step of applying a first IR energy comprises applying short-wave IR energy having a peak wavelength of approximately 1100 nm.

14. The method of claim 12, wherein said step of applying another IR energy comprises applying short-wave IR energy having a peak wavelength of approximately 1100 nm.

* * * * *